Nov. 11, 1958 W. JUDA ET AL 2,860,096
POLYELECTROLYTES AND THE METHOD OF MAKING THE SAME
Filed June 15, 1955
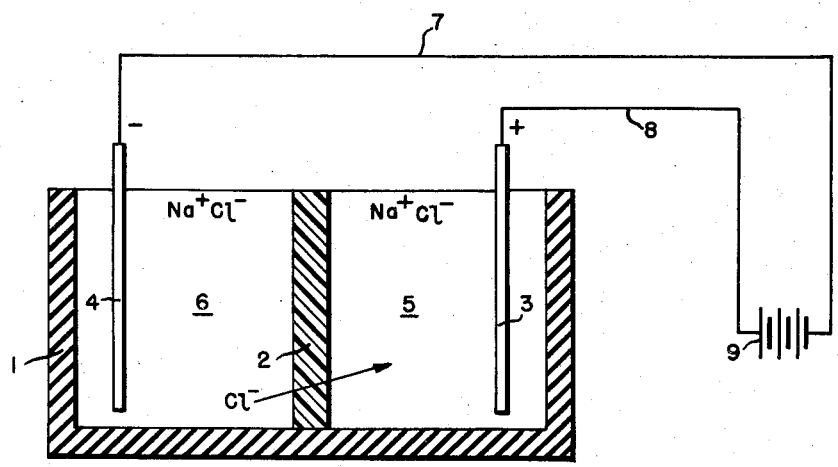
Inventors:
Walter Juda,
Allan H. Hamerschlag,
by Harm Tuskin
Attorney

United States Patent Office 2,860,096
Patented Nov. 11, 1958

2,860,096

POLYELECTROLYTES AND THE METHOD OF MAKING THE SAME

Walter Juda, Lexington, and Allan H. Hamerschlag, Boston, Mass., assignors to Ionics, Incorporated, Cambridge, Mass., a corporation of Massachusetts Application June 15, 1955, Serial No. 515,732

15 Claims. (Cl. 204—180)

This invention relates to synthetic organic cationic polyelectrolytes comprising the quaternized products of haloalkylated copolymers of ethylenic aromatic and N-alkylated N-heterocyclic ethylenic compounds. It has for its primary object the preparation of these materials into linear, water soluble polyelectrolytes as well as cross-linked insoluble water-swellable polyelectrolytes in the granular or sheet form, the latter being anion selectively permeable, electrically conductive and hydraulically impermeable in character. The water soluble polyelectrolytes of this invention in the form of linear polymers of an ethylenic N-alkylated N-heterocyclic compound and a monoethylenic aromatic hydrocarbon having dissociable electrolytic groups attached thereto have been found to be very useful as bacteriostatic and bactericidal agents, coagulants and flocculants, adhesives, soil additives and sequesterants.

In general, the process of the present invention comprises the copolymerization of an ethylenic N-heterocyclic compound with an ethylenic aromatic hydrocarbon. When the ethylenic aromatic compound is a monoethylenic compound, such as styrene, the polymer results in a soluble linear polyelectrolyte whereas when the ethylenic aromatic compound is a polyethylenic aromatic hydrocarbon, such as diisopropenyl benzene, cross-linking is effected and a solid, insoluble, infusible polyelectrolyte results.

The solid structures of this invention include solid solvated gels in the form of granules, sheets or membranes which have as a skeletal structure an insoluble, infusible polymeric matrix which includes polyethylenic aromatic hydrocarbons and ethylenic N-alkylated N-heterocyclic compounds with dissociable cationic groups bonded to the aromatic nuclei.

The presence of the cationic groups distributed throughout the matrix on the aromatic and N-heterocyclic nuclei imparts to these structures a fixed cationic charge electrostatically associated with a mobile replaceable anion. Thus when the cationic groups are dissociated as occurs when the solvating liquid is water and the structure is a hydrous gel, these materials exhibit anion exchange characteristics. Moreover, because a fixed positive charge is retained by the matrix throughout the gel, anions may be readily caused to permeate these structures while cations are repelled by the like charge of the matrix. These materials are accordingly electrically conductive and selectively permeable to anions.

Hitherto vinyl pyridine-polyvinyl hydrocarbon copolymers have been made in the granular form (Jackson U. S. Patent No. 2,540,985) but in this case pyridine nitrogen only is N-alkylated (quaternized) whereas in the present case both the N-heterocyclic compound and the aromatic hydrocarbon have dissociable salt groups.

Also, monovinyl and polyvinyl aromatic hydrocarbon copolymers containing amino alkyl groups on the aromatic hydrocarbon nucleus are known but in this case there is no N-alkylated N-heterocyclic compound present to give the desired and improved results of the present case. The former copolymers are of limited usefulness owing to the low thermohydrolytic stability of the quaternary alkyl pyridinium groups to reversion to a pyridine group (which has an unsatisfactorily low ($1.4 \times 10^{-9}$) ionization constant to be of use as a polyelectrolyte). On the other hand, the latter copolymers are of limited water solubility unless the equivalent weight of aminated haloalkyl groups is below 300 since the aromatic hydrocarbon residues are not appreciably soluble in water. The present copolymers combine a substantial proportion of thermohydrolytically stable ionic groups with a substantially water solvatable skeletal structure containing quaternary N-alkyl N-heterocyclic groups.

The process of producing the solid, infusible, structures of the present case consists first in forming a solid solvated gel structure which is coherent and homogeneous, and which comprises a cross-linked polymeric matrix having aromatic and N-heterocyclic nuclei and a continuous liquid phase in gel relationship with the matrix. The gel structures are thereafter haloalkylated and aminated by treating with a tertiary organic amine to incorporate dissociable groups on the aromatic nuclei. The heterocyclic nitrogen may be alkylated to form a quaternary nitrogen group either before polymerization or after, and either before or after amination, as will be pointed out more fully below.

The figure in the drawing is a schematic view of the electrolytic cell arrangement in which the membranes are employed.

The gel structures suitable for membranes or sheets are formed by dissolving in a suitable organic solvent, material polymerizable to a solid cross-linked structure having ethylenic aromatic and ethylenic N-heterocyclic nuclei, disposing the solution to the desired form (i. e. membranes or sheets) and then effecting polymerization under conditions preventive of the evaporation of solvent. (If granular materials suitable for conventional ion exchange are required it is not necessary to carry out the polymerization under conditions preventive of the evaporation of solvent.) The polymerizable ingredients thus polymerize while in solution to a cross-linked insoluble matrix which uniformly permeates the mass of the solution and occludes the solvent as a solvating or swelling liquid phase of a coherent homogeneous gel. The polymeric matrix is thus formed to accommodate the liquid phase and results in a highly solvated gel having an unstressed solid matrix. The volume of the solvent has been found to determine or fix the equilibrium liquid volume of the gel structure. That is, the gel retains about the same volume of liquid when one liquid is displaced by another, or when it is partially dried and resolvated. It has further been observed that the solid gel structure is subject to shrinkage when solvent is removed from it, as by evaporation, which indicates a non-rigid solvated structure having limited extensibility.

The prevention of loss of solvent during polymerization of sheets or membranes is an important feature of this invention; it makes it possible to produce a continuous homogeneous product having the desired characteristics of mechanical and hydraulic stability. In the processes of the prior art, wherein polymerization is not effected in the presence of a solvent or wherein the solvent if present is permitted to evaporate, the polymers consist either of vitreous, non-permeable structures, characteristic of molding resins, or of fractured particulate structures characteristic of ordinary granular ion-exchange resins. Polymeric structures which are not formed in the presence of a solvent may be solvated to some extent by immersing them in a solvating liquid, but the result is to subject the polymeric structures to severe swelling stresses which seriously impair their mechanical strength, frequently to the point of causing fracturing of the structure. The structures of the present invention are not subject to these stresses.

The polymerizable materials from which the polyelectrolytes are formed are ethylenic aromatic and ethylenic N-heterocyclic compounds copolymerizable to linear polymers or to three dimensioned cross-linked matrixes. The majority of such ethylenic compounds which are available in practical quantities are vinyl compounds, though it will be understood that vinylene and vinylidene compounds are equally useful. In the remainder of this specification and in the claims such ethylenic compounds are referred to as vinyl compounds. Similarly, the majority of ethylenic N-heterocyclic compounds which are available in practical commercial quantities are related to vinyl pyridine and will be referred to hereinafter as vinyl pyridine compounds. Cross-linking may be provided by the aromatic vinyl compound itself in combination with the N-heterocyclic ingredient or by materials copolymerizable therewith to form cross-links between polymeric chains of the aromatic and N-heterocyclic compounds. For instance, the polymeric matrix may be formed by copolymerization of divinyl benzene (with or without a monovinyl benzene) with 2-vinyl pyridine. Owing to the pair of vinyl groups on the monomeric aromatic molecule a cross-linked structure is produced. When divinyl benzene is used as a cross-linking material, satisfactory results are attained when it is included with a monovinyl aromatic compound such as styrene, ethyl styrene, vinyl toluene, isopropenylbenzene, chlorostyrene, alpha methylstyrene, vinyl naphthalene, vinyl biphenyl and derivatives thereof, in combination with a N-heterocyclic compound such as 2-vinyl pyridine, 4-vinyl pyridine, 5 ethyl 2 vinyl pyridine, 5 vinyl 2 methyl pyridine, vinyl quinoline, vinyl carbazole, vinyl pyrrolidone, etc. to the extent of 15 mol percent based on total ploymerizable ingredients, but preferred embodiments include higher proportions, such as 33%, even up to 70%. There may also be included with the vinyl aromatic-vinyl heterocyclic compounds limited amounts of aliphatic material copolymerizable therewith, e. g. butadiene, alkyl acrylate esters, and acrylate esters, acrylonitrile, vinyl halides, and methyl vinyl sulfide, but their presence inherently reduces the concentration of N-alkylated N-heterocyclic nuclei and aromatic nuclei susceptible to haloalkylation and amination and tends to result in a lower ion-exchange capacity. Suitable cross-linking materials in addition to divinyl benzene are divinyl ether of ethylene glycol, divinyl ether of diethylene glycol (divinyl carbitol), vinyl methacrylate, etc.

In general the amine reactive with the haloalkyl group is a tertiary amine and has the formula $R_3N$ where R is an aliphatic radical preferably containing no more than 4 carbon atoms. Suitable tertiary amines include trimethylamine, methyl diethanolamine, triethanolamine, dimethyl ethanolamine, triethylamine, NN dimethylaniline, pyridine, picoline, lutidine, and collidine. The resulting active group has a formula of $C_nH_{2n}NR_3X$, X being an anion such as $OH^-$, $Cl^-$, $SO_4^=$, $HCO_3^-$, acetate etc. where n is 1, 2, 3, or 4. The resulting active groups have a dissociation constant of $10^{-5}$ or greater.

The heterocyclic nitrogen may be alkylated with or without the application of heat or the presence of a catalyst by any of the well known nitrogen alkylating reagents such as diazomethane, alkyl halides such as methyl bromide, ethyl iodide, benzyl chloride, etc.; alkyl sulfates such as dimethyl sulfate, diethyl sulfate, dilauryl sulfate, etc., and alkyl aryl sulfonates such as methylbenzene sulfonate. Alkylation in this manner converts the vinyl pyridine compound to an alkyl vinyl pyridinium salt according to the general reaction:

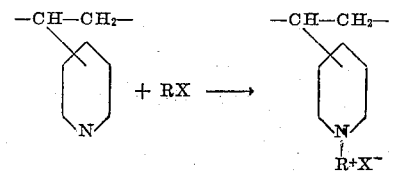

It should be understood that the heterocyclic nitrogen may be quaternized (N-alkylated) equally well at any of a number of points in the above process, for example, before polymerization, during polymerization, before haloalkylation, and after amination of the haloalkyl groups. Examples of some of these procedures are given below. It is frequently advantageous to carry out the alkylation before polymerization for in this instance the copolymerization of the N-alkylated N-heterocyclic amine with the vinyl aromatic compound may proceed without a catalyst.

A solid gel structure is formed by dissolving the polymerizable materials with or without suitable catalyst and accelerators in from about 20% to about 70% of an organic solvent (by volume on total volume) and then effecting polymerization of the dissolved material under conditions which prevent the escape of solvent. In general, such suitable solvents should be inert during polymerization and should be solvating or swelling agents for the polymerized gel structure. The following solvents are recommended: benzene toluene, xylene, diethyl benzene, diisopropyl benzene, and dioctyl phthalate. Polymerization is effected by any suitable expedient such as heat or light, and is continued until an insoluble, infusible, solvated gel is formed. In the preferred embodiment utilizing divinyl benzene, monovinyl aromatic compounds (such as styrene or ethyl styrene) and 2-vinyl pyridine, preferred organic solvents include diethyl benzene and diisopropylbenzene, and the most satisfactory results are obtained when the solvent is present to the extent of about 30 to 50% by volume. However, as already indicated, as little as 20% solvent or as much as 70% has been found satisfactory.

Membrane structures produced in accordance with this invention are advantageously formed to occlude a reinforcing material or web such as microporous sheets, felts, fabrics, mats, etc. in order to increase the mechanical strength (tensile strength and tear resistance) of the membrane. Suitable reinforcing materials include in general woven or felted sheet materials such as glass filter cloth, polyacrylonitrile screen, microporous chlorotrifluoro ethylene sheets, glass paper, treated cellulose paper, and fiber mats of polystyrene coated glass fibers, and similar porous materials of appreciable strength which are not attacked substantially during the polymerization, haloalkylation, amination and N-alkylation steps. In forming a reinforced membrane, a suitable technique is to place the reinforcing sheet on a flat casting surface (such as a glass, or stainless steel plate), pour the solution of polymerizable ingredients onto the casting surface embedding the reinforcing sheet, then place a second flat surface over the cast to prevent evaporation of solvent, and finally heat the solution and plates to cause polymerization. The cured cast is then leached preferably with a non-aromatic solvent (such as ethylene dichloride, tetrachlorethylene, etc.) to remove the bulk of the non-polymerized aromatic material and to replace the organic solvent of polymerization with a solvent inert to haloalkylation. The haloalkylation solvent must be a swelling agent for the polymer and must not be permitted to escape substantially.

The gel structure is haloalkylated by treating it with well-known haloalkylating agents under conditions which do not result in loss of gel liquid. Apparently, the continuous liquid phase throughout the gel makes it possible to treat the structure with a haloalkylating agent and obtain substantially uniform haloalkylation throughout the structure. One preferred method of haloalkylation comprises immersing the polymerized gel in a chloromethyl alkyl ether with or without an inert solvent or diluent in which is dissolved a suitable Friedel-Crafts catalyst such as aluminum chloride, stannic chloride or titanium tetrachloride. This may be done at room temperature and requires about an hour or more to treat a membrane of about 1 mm. in thickness. It will be understood, the requisite time of immersion depends largely on the shape and size of the article and reactivity of the chloromethylating bath and may, accordingly, be considerably longer. Chloromethylation results in the bonding of chloromethyl groups to the aromatic nuclei.

Following haloalkylation, the gel structure is treated with a tertiary amine to form quaternary ammonium halide groups from the haloalkyl groups. As pointed out above, the heterocyclic nitrogen may be N-alkylated at various stages of the process.

Suitable amines, already referred to, comprise in general the alkyl and alkanol tertiary amines, where preferably such amines have 4 or fewer carbon atoms. The quaternary ammonium halide groups formed from tertiary amines are preferred for most applications since they are highly dissociable into a positively charged radical bonded to the aromatic nuclei, and hence, fixed to the polymeric structure, and a negatively charged free mobile halide ion in electrostatic association with the positive charges of the polymeric matrix. Quaternization is conveniently carried out by immersing the haloalkylated gel structure in a solution of a tertiary amine, for instance, it may be immersed in a 25% aqueous solution of trimethylamine.

The gel structure is now washed with water to remove unused reactants and is ready for use. The gel structure when treated with an aqueous amine during quaternization is converted to the hydrous form, the water displacing the solvent previously present. A characteristic of the gel structures of this invention is that one solvating liquid may be replaced by others. If an aqueous amine is not used during quaternization, the gel structures are normally converted to the hydrous form by immersion in water or an aqueous solution before use.

These structures in the hydrous chloride form have been found to have high electrical conductivity generally in excess of $5 \times 10^{-3}$ ohm$^{-1}$ cm.$^{-1}$.

Structures of any desired form or size may be made in accordance with this invention by casting or molding (including pressure molding) or otherwise forming a solution of the polymerizable monomers and effecting polymerization in the mold while preventing the evaporation or escape of substantial amounts of solvent, for instance, by closing the mold or by otherwise carrying out the polymerization under substantially saturated solvent condition. In this way, forms and structures may be obtained in far greater size than structures in which conventional ion-exchange materials have been made in the past. Of particular interest is the fact that continuous hydraulically impermeable uniform sheets or membranes may be formed in accordance with this invention. Moreover, the molded article may be machined by conventional techniques.

The present invention and its objects, features and utility will be better understood from the following detailed description of preferred embodiments thereof and from the drawing showing a diagrammatic elevation in cross section of an electrodialytic cell containing a membrane produced in accordance with the invention.

The divinyl benzene used in the examples is the commercial grade which is obtainable under several concentration designations. The actual analysis of the grades used herein are given below.

TABLE I

| Designation | 20-25% DVB | 40-50% DVB | 50-60% DVB | 75% DVB |
|---|---|---|---|---|
| Divinyl benzene  percent by weight | 17 | 47 | 54 | 75 |
| Ethyl styrene do | 49 | 43 | 40 | 24 |
| Diethyl benzene do | 34 | 10 | 8 | 1 |

*Example 1*

Thirty-six cc. of 2-vinyl pyridine containing 0.1% hydroquinone were dissolved in 40 cc. of isopropanol and the solution was heated to 55° C., and 36 cc. of dimethyl sulfate were added slowly while stirring, at a rate to maintain the temperature below 65° C. After about 10 minutes, the solution was cooled to room temperature and 36 cc. of commercial 40 to 50% divinyl benzene were added. The mixture was warmed to 40° C. and stirred until homogeneous and then cast between parallel glass plates spaced about 1 mm. apart and on a woven dynel cloth (dynel sometimes referred to as Vinyon N is a copolymer of vinyl chloride and acrylonitrile). The cast was cured in an oven at 65° C. for 5 hours to effect polymerization. During polymerization, evaporation of the solvent into the space between the plates beyond the area occupied by the cast occurred only at the edges of the cast. The dried edges sealed the interior of the cast from additional evaporation and were trimmed off and discarded. After cooling, the cast sheet was removed and leached in dichloroethyl ether to remove the solvent of polymerization and thereafter placed in a bath of chloromethyl ether containing 100 grams per liter of anhydrous aluminum chloride. The cast remained in this bath for 16 hours at room temperature whereupon it was leached thoroughly in methanol and immersed in a bath of aqueous 15% trimethylamine for 24 hours. The resulting membrane was leached thoroughly with water.

*Example 2*

Eighty cc. of commercial 75% divinyl benzene, 108 cc. of distilled 4-vinyl pyridine, 125 cc. of diisopropyl benzene and 0.6 gram of 2-azo bis (iso butyronitrile) were mixed and cast onto a glass paper surfacing mat 0.8 mm. thick between two glass plates. The cast was baked at 80° C. for three hours and then removed from the mold. The dried edges were trimmed off as in Example 1 and the resulting sheet was leached thoroughly in absolute ethanol and then heated for twenty hours at 60° C. in a mixture of 25 parts of dimethyl sulfate and ten parts absolute ethanol. The sheet was then leached thoroughly with dichloroethyl ether and thereafter placed in a bath of chloromethyl iso propyl ether containing 100 grams per liter of anhydrous aluminum chloride. The cast remained in the bath for 20 hours at room temperature, whereupon it was leached thoroughly in methanol and immersed in a bath of aqueous dimethylethanolamine at 50° C. for 48 hours. After cooling to room temperature, the resulting membrane was leached thoroughly with water.

*Example 3*

Forty-five cc. of commercial 20 to 25% grade divinyl benzene, 55 cc. of commercial 40 to 50% divinyl benzene, 41.4 cc. of 97% 2-vinyl 5 ethyl pyridine, 52.3 cc. of diethyl benzene, and 0.82 gram of benzoyl peroxide were mixed thoroughly at room temperature and cast between two glass plates 1 mm. apart on a reinforcing of glass filter cloth. The cast was heated at 80° C. for 14 hours in a tray filled with some of the mixture. The cast, after cooling to room temperature, was removed and leached thoroughly in ethylene chloride and thereafter immersed in a mixture of 30 parts of chloromethyl ether and 3 parts of anhydrous ferric chloride for 14 hours at room temperature. The sheet was then leached in iso propyl ether and placed in a 27% solution of diazomethane in ethyl ether for 96 hours to quaternize the heterocyclic nitrogen. The sheet was then leached thoroughly in methanol and immersed in a 25% aqueous solution of trimethylamine for 48 hours at room temperature. The resulting membrane was leached thoroughly with water.

*Example 4*

One hundred grams of para methoxy styrene and 100 grams of 5-vinyl, 2-methyl pyridine were mixed with 0.8 gram of cumene hydroperoxide and heated at 90° C. under reflux for 20 hours at atmospheric pressure and then at 135° C. under vacuum for 5 hours. While still hot, the polymer was poured into a tray. It hardened on cooling to room temperature and was pulverized and dissolved in chloromethyl ether containing 5 percent anhydrous stannic chloride. The mixture was allowed to stand for 24 hours at room temperature and was then poured into water to precipitate the linear polymer. The resulting solid was washed with water and then dissolved in aqueous trimethylamine and allowed to stand at room temperature for 24 hours. This solution was poured into several volumes of acetone to precipitate the polymer again. The latter was dried at 60° C. and after cooling was dissolved in a solution of absolute ethanol containing about 100 grams per liter of paraethyl toluene sulfonate. The solution was heated at 60° C. for 72 hours and after cooling was poured into several volumes of acetone to precipitate the product which was dried at 60° C.

Example 1 illustrates the preparation of insoluble, infusible relatively permeable membranes and the N-alkylation (specifically N-methylation) of 2-vinyl pyridine before polymerization. In this case, a conventional polymerization catalyst is not required. The slight excess of dimethyl sulfate apparently causes polymerization of the monomers by an ionic mechanism and is, of course, advantageous.

Example 2 illustrates the N-alkylation of the N-heterocyclic compound after polymerization but before haloalkylation.

Example 3 illustrates N-alkylation of the heterocyclic nitrogen after haloalkylation but before amination of the haloalkyl substituent.

Example 4 illustrates the preparation of a soluble linear polyelectrolyte and N-alkylation (specifically N-ethylation of the N-heterocyclic compound after amination of the haloalkyl substituent).

The properties of the materials prepared in the examples were measured and are given in Table II compared to similar materials prepared in a similar manner except in Examples 3 and 4 for omission of the N-alkylating step and in Examples 1 and 2 for the omission of the haloalkylating and aminating steps.

TABLE II

CAPACITY (MILLIEQUIVALENTS/DRY GRAM OF RESIN)

| Example | As Prepared | Comparison |
|---|---|---|
| 1 | 4.5 | 3.5 |
| 2 | 2.1 | 1.0 |
| 3 | 3.2 | 2.0 |
| 4 | 4.2 | 2.8 |

RESISTIVITY

| | | |
|---|---|---|
| 1 | 30 | 45 |
| 2 | 50 | 220 |
| 3 | 35 | 180 |
| 4 | | |

In the examples, divinyl benzene is the preferred vinyl aromatic compound used in conjunction with styrene and/or ethyl styrene, and 2-vinyl pyridine is the preferred N-heterocyclic compound. It will be understood from the foregoing, however, and from the nature of the chemical reactions involved during the N-alkylation, haloalkylation and amination steps that membrane structures in accordance with the present invention may be made from a great number of polymerizable aromatic and N-heterocyclic compounds, provided there is present an amount of polymerizable polyvinyl compound in excess of 15 mol percent. In other words, the matrix must be suitably cross-linked and must also contain aromatic nuclei which may be haloalkylated and subsequently aminated. Other vinyl aromatic compounds which may be used for cross-linking include divinyl toluene, divinyl naphthalene, divinyl diphenyl, divinyl diphenyl ether, diisopropenyl benzene, divinyl ether of ethylene glycol, vinyl methacrylate and the substitute alkyl derivatives thereof, such as dimethyl-divinyl benzene and similar polymerizable aromatic compounds which are polyfunctional in vinyl groups.

Haloalkylation can be performed with haloalkylating agents other than chloromethyl ether, such as other haloalkyl ethers of the general formula

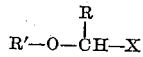

(where R is hydrogen or an alkyl group preferably no higher than propyl, R' is an alkyl group preferably no higher than butyl, and X represents chlorine, bromine or iodine), and mixtures of hydrogen halides and aliphatic aldehydes, e. g. hydrogen bromide and acetaldehyde. Similarly, the preferred quaternary amination of the haloalkyl group may be performed with a great number of aliphatic or alicyclic tertiary amines, including tripropylamine, ethylpropylisobutylamine; dimethylaniline, methyl ethylaniline and other dialkyl anilines; dimethyl toluidine; pyridine; quinoline; 2-methylquinoline; methyltetrahydroquinoline; triisoamylamine, to name but a representative few, dissolved in a polar solvent such as water or lower aliphatic alcohols.

In the examples the benzoyl peroxide 2 azo bis (isobutyronitrile) and cumene hydroperoxide were included to catalyze the polymerization. Other suitable catalysts are catalysts and/or accelerators for free radical polymerizations, and boron trifluoride and other catalysts for polymerization by the ionic mechanism. In Example 1, no catalyst was required.

A simple electrodialysis cell utilizing a membrane of the present invention is shown in the drawing. It consists of a container 1 separated into compartments 5 and 6 by a membrane 2 prepared in accordance with any of the foregoing examples. A graphite anode 3 is situated in compartment 5 and a graphite cathode 4 is situated in compartment 6. Power leads 8 and 7 connect these electrodes 3 and 4, respectively, with a source of voltage, for example, a D. C. battery 9. The compartments 5 and 6 each contain an electrolytic solution of 0.03 N sodium chloride. It is found that the current passing between the electrodes 3 and 4 is carried across the membrane 2 almost exclusively by chloride ions migrating from compartment 6 into compartment 5. In this apparatus, the membrane 2 provides a barrier which makes it possible to transfer chloride ions from one solution to another to the substantial exclusion of cation transfer. Representative processes and apparatus in which the membranes of this invention may be advantageously utilized, are described in the following copending applications and patent: Walter Juda and Wayne A. McRae, Ser. No. 207,289, filed January 23, 1951, now Patent 2,767,135; Davis R. Dewey III, and Edwin R. Gilliland, Ser. No. 213,514, filed March 2, 1951, now Patent 2,741,591; and U. S. Pat. No. 2,636,852 (Juda et al.), issued April 28, 1953.

Having thus disclosed my invention, I claim and desire to secure by Letters Patent:

1. A polymeric electrolyte comprising a copolymer of a vinyl N-alkylated vinyl pyridine compound of the class consisting of monovinyl pyridine, and the alkyl substituted monovinyl pyridines, and polymerizable vinyl aromatic hydrocarbons and the substituted alkyl and halo derivatives thereof, said aromatic hydrocarbons having bound to the aromatic nucleus a quaternary amine group of the formula $C_nH_{2n}NR_3X$, where $n$ is no greater than 4, R is an aliphatic radical containing no greater than 4 C atoms, and X is an anion, said N-alkylated vinyl pyridine compound being present in amount between 15 and 70 mol percent of the copolymer, and said quaternary amine group being present in amount exceeding 0.3 meq. per gram of copolymer.

2. The polymeric electrolyte of claim 1 wherein the polyelectrolyte is water soluble and is a copolymer of a monovinyl N-alkylated vinyl pyridine compound and a quaternary aminated haloalkylated monovinyl aromatic hydrocarbon.

3. The polyelectrolyte of claim 2 wherein the monovinyl N-alkylated vinyl pyridine compound is of the group consisting of 2 vinyl, 4 vinyl, and 5 ethyl, 2 vinyl pyridine, and the monovinyl aromatic hydrocarbon is of the group consisting of styrene and vinyl toluene.

4. As an article of manufacture a solid, infusible, insoluble structure comprising a copolymer of a vinyl N-alkylated vinyl pyridine compound and a polyvinyl aromatic hydrocarbon, said aromatic hydrocarbon having bound to the aromatic nucleus a quaternary amine group of the formula $C_nH_{2n}NR_3X$, where $n$ is no greater than 4, R is an aliphatic radical containing no greater than 4 C atoms, and X is an anion, said N-alkylated vinyl pyridine compound being present in an amount between 15 and 70 mol percent of the copolymer, and said quaternary amine groups being present in amount exceeding 0.3 meq. per gram of copolymer.

5. As an article of manufacture a solid, insoluble, infusible, anion-exchange structure comprising a cross-linked copolymer of a vinyl N-alkylated vinyl pyridine compound and an amine derivative of a haloalkylated polyvinyl aromatic hydrocarbon in gel relationship with from 20% to 70% by volume of a solvating liquid, said polymer being a selectively anion permeable and electrically conductive solid structure.

6. As an article of manufacture a solid, unfractured, insoluble, and infusible structure in the form of a sheet comprising a copolymer of a vinyl N-alkylated vinyl pyridine compound and a polyvinyl aromatic hydrocarbon, said hydrocarbon having bound to the aromatic nucleus an amine group of the formula $C_nH_{2n}NR_3X$, where $n$ is an integer no greater than 4, R is an aliphatic radical containing no greater than 4 C atoms, and X is an anion, said N-alkylated vinyl pyridine compound being present in amount between 15 and 70 mol percent of the copolymer, and said quaternary amine group being present in amount exceeding 0.3 meq. per gram of copolymer.

7. As an article of manufacture a solid, unfractured, anion-exchange structure in the form of a sheet, said structure having a reinforcing sheet material therein, and comprising a substantially insoluble, infusible polymeric matrix which is a copolymer of a polyvinyl aromatic hydrocarbon and a N-alkylated vinyl pyridine compound having dissociable quaternary ammonium groups bound to at least some of the aromatic nuclei, in gel relationship with from 20% to 70% of an aqueous solvating liquid, by volume on total volume, said liquid presenting a continuous phase throughout said gel, said polyvinyl aromatic hydrocarbon exceeding 15 mol percent based on the total vinyl compound.

8. The article of claim 7 wherein the N-alkylated vinyl pyridine compound is selected from the group consisting of the N-alkylated derivatives of 2 vinyl pyridine, 4 vinyl pyridine, 2 vinyl 5 ethyl pyridine, and mixtures thereof.

9. In the method of forming a polymeric electrolyte of a copolymer of a N-alkylated vinyl pyridine compound and a quaternary aminated haloalkylated divinyl aromatic hydrocarbon which comprises dissolving at least one polymerizable vinyl aromatic hydrocarbon selected from the group consisting of the vinyl aromatic hydrocarbons and the substitute halo and alkyl derivatives thereof in combination with a vinyl pyridine compound to the extent of at least 15 mol percent based upon total polymerizable ingredients, in from about 20% to about 70% of an organic solvent, by volume on total volume, polymerizing the solute, haloalkylating the copolymer and treating the same with an amine of the formula $NR_3$, where R is an aliphatic radical containing no more than 4 C atoms; the step of reacting the vinyl pyridine compound with an N-alkylating agent to form a quaternary nitrogen pyridine compound.

10. The method of making a polymeric electrolyte of claim 9, wherein the polymerizable vinyl compounds are a monovinyl pyridine hydrocarbon and a monovinyl aromatic hydrocarbon whereby a water soluble polyelectrolyte is produced.

11. The method of forming a solid, infusible, insoluble structure of claim 9, wherein the polymerizable vinyl aromatic hydrocarbon comprises a polyvinyl aromatic hydrocarbon whereby a solid, infusible polyelectrolyte is produced.

12. The method of forming a solid, anion permeable, unfractured, infusible structure in the form of a sheet of a copolymer of a vinyl N-alkylated vinyl pyridine compound and a quaternary aminated haloalkylated vinyl aromatic hydrocarbon wherein polymerizable vinyl aromatic hydrocarbons selected from the group consisting of vinyl aromatic hydrocarbons, the substituted halo and alkyl derivatives thereof and mixtures thereof, in combination with a cross-linking agent therefor, and a vinyl pyridine compound to the extent of at least 15 mol percent based upon total polymerizable ingredients are dissolved in from about 20% to about 70% of an organic solvent by volume on total volume, the solution is disposed with a reinforcing material therein to a sheet form, the solutes are polymerized under conditions substantially preventive of the escape of solvent to form a solid coherent gel, the gel is haloalkylated and the haloalkylated gel is treated with a solution of an aliphatic amine while retaining substantially the same solvent concentration, said amine having the formula $NR_3$, where R is an aliphatic radical containing no more than 4 C atoms; the step of reacting the vinyl pyridine compound with an N-alkylating agent therefor, to form a quaternary nitrogen pyridine compound.

13. The method of claim 12 wherein the vinyl pyridine compound is selected from the group consisting of 2 vinyl pyridine, 4 vinyl pyridine, and 2 vinyl, 5 ethyl pyridine.

14. The method of claim 13 wherein the aliphatic amine is selected from the group consisting of trimethylamine, dimethyl ethylamine and dimethyl ethanolamine.

15. The method of transferring anions from one solution to another to the substantial exclusion of the transfer of cations, comprising separating the solutions by at least one solid, unfractured, continuous sheet, said sheet comprising: an insoluble, infusible, polymeric matrix containing polyvinyl aromatic hydrocarbons and vinyl N-alkylated vinyl pyridine compounds and having dissociable quaternary ammonium groups bound to the aromatic nuclei in gel relationship with about 20% to about 70% by volume of an aqueous solvating liquid as a continuous phase, said matrix having imbedded therein a reinforcing material, and passing a direct electric current through said solutions and sheet in series, thus effecting migration of said anions from one solution through said sheet into the other solution.

(References on following page)

References Cited in the file of this patent

UNITED STATES PATENTS

| | | |
|---|---|---|
| 2,681,319 | Bodamer | June 15, 1954 |
| 2,687,382 | Butler | Aug. 24, 1954 |
| 2,694,680 | Katz et al. | Nov. 16, 1954 |
| 2,723,245 | Wheaton | Nov. 8, 1955 |
| 2,732,351 | Clarke | Jan. 24, 1956 |

OTHER REFERENCES

J. Polymer Science, volume 4, pages 97–120, April 1949.